US008929252B2

(12) United States Patent
Subramanyan et al.

(10) Patent No.: US 8,929,252 B2
(45) Date of Patent: *Jan. 6, 2015

(54) VIRTUAL PORT WORLD WIDE NAMES

(71) Applicant: Brocade Communications Systems, Inc., San Jose, CA (US)

(72) Inventors: Srikara Subramanyan, San Jose, CA (US); Badrinath Kollu, San Jose, CA (US); Ganesh Kumar Murugesan, Medavakkan (IN); Nhan Trong Pham, Fremont, CA (US); Sathish Kumar Gnanasekaran, Sunnyvale, CA (US); Nadeem Kattangere, San Jose, CA (US); Vinodh Ravindran, San Jose, CA (US); Vidya Renganarayanan Vineet, Sunnyvale, CA (US); Vidya Sagar Ravipati, San Jose, CA (US); Blayne Rawsky, Boulder, CO (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,104

(22) Filed: Jun. 3, 2014

(65) Prior Publication Data

US 2014/0286194 A1 Sep. 25, 2014

Related U.S. Application Data

(63) Continuation of application No. 13/401,287, filed on Feb. 21, 2012, now Pat. No. 8,774,052.

(60) Provisional application No. 61/446,384, filed on Feb. 24, 2011.

(51) Int. Cl.
*H04L 12/28* (2006.01)

(52) U.S. Cl.
CPC .................................... *H04L 12/28* (2013.01)
USPC ........................................ 370/254; 370/255

(58) Field of Classification Search
CPC ....... H04L 49/30; H04L 49/357; H04L 45/02; H04L 41/12; H04L 49/70
USPC .......... 370/357–358, 254, 255; 709/223–226, 709/227, 245, 244, 220
See application file for complete search history.

(56) References Cited

U.S. PATENT DOCUMENTS

| 5,740,171 | A  | * | 4/1998  | Mazzola et al. ............... 370/392 |
| 5,796,732 | A  | * | 8/1998  | Mazzola et al. ............... 370/362 |
| 7,523,207 | B2 |   | 4/2009  | Chen et al. |
| 7,831,681 | B1 |   | 11/2010 | Salli |
| 7,873,744 | B2 |   | 1/2011  | Chen et al. |
| 8,099,525 | B2 |   | 1/2012  | Nicholson et al. |

(Continued)

*Primary Examiner* — Chuong T Ho
(74) *Attorney, Agent, or Firm* — Wong, Cabello, Lutsch, Rutherford & Brucculeri, L.L.P.

(57) ABSTRACT

A network switch allows defining a virtual port worldwide name (VPWWN) and associating the VPWWN with an F_port of the network switch, for use by a host bus adaptor (HBA) connecting to the network switch. Both a default and a user VPWWN may be defined, with the user VPWWN typically taking precedence over the default VPWWN. A database of VPWWN associations may be used to ensure uniqueness of the user VPWWN. Where the HBA allows dynamic assignment of WWNs, the VPWWN may be pushed to the HBA. The VPWWNs may be deleted, and moved to another port as desired.

18 Claims, 10 Drawing Sheets

(56) References Cited

U.S. PATENT DOCUMENTS

| | | |
|---|---|---|
| 2003/0189929 A1 | 10/2003 | Matsuzaki et al. |
| 2005/0114476 A1 | 5/2005 | Chen et al. |
| 2008/0177871 A1 | 7/2008 | Howard et al. |
| 2008/0205299 A1 | 8/2008 | Chen et al. |
| 2008/0281993 A1 | 11/2008 | Nicholson et al. |
| 2009/0092141 A1 | 4/2009 | Banerjee |

* cited by examiner

VIRTUAL PORT WORLD WIDE NAMES

CROSS REFERENCE TO RELATED APPLICATIONS

This application is a continuation of U.S. patent application Ser. No. 13/401,287 entitled "Virtual Port World Wide Names," filed Feb. 21, 2012, and claims priority to U.S. Provisional Application Ser. No. 61/446,384 entitled "Virtual Port WWN" filed Feb. 24, 2011, both of which are incorporated by reference in their entirety herein.

TECHNICAL FIELD

The present invention relates to the field of computer networks, and in particular to a technique for associating a virtual port worldwide name with a port for assignment to a device connecting to that port.

BACKGROUND ART

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Typically, hosts and storage devices (generically, devices) connect to switches through a link between the device and the switch, with a node port (N_port) of the device connected to one end of the link and a fabric port (F_port) of a switch connected to the other end of the link. The N_port describes the capability of the port as an associated device to participate in the fabric topology. Similarly, the F_port describes the capability of the port as an associated switch.

Over time, SANs have become more complex, with fabrics involving multiple switches that use inter-switch links (ISLs) connected to switch ports (E_ports) on the switches. In some SANs, a core group of switches may provide backbone switching for fabric interconnectivity, with few or no devices directly connected to the core switches, while a number of edge switches provide connection points for the devices or devices of the SAN. Additional layers of switches may also exist between the edge switches and the core switches.

Worldwide Names (WWNs) are identifiers that identify a particular FC target. WWNs are assigned to both nodes and ports in an FC fabric. Ports in an FC fabric are assigned Port WWNs (PWWNs) (also known as Worldwide Port Names or WWPNs). Like all WWNs, PWWNs must be unique in a fabric. This assignment is typically done by the manufacturer as part of the manufacturing process.

One problem that current SANs are faced with is the management of PWWNs in a fabric. Zoning in most cases uses PWWNs. Storage arrays are provisioned based on PWWNs. Provisioning of a fabric is currently difficult to plan ahead, and is usually done after the arrival of a server that needs to be connected to the fabric. In addition, if a server connected to a fabric fails, replacing the failed server is quite difficult, and requires many steps, including updating Boot LUN (Logical Unit) zones, fabric zones, and LUN masks. Other advanced fabric features, such as Quality of Service (QoS) require WWNs, including PWWNs.

For example, to attach a server to a fabric today, a fabric wide configuration change is required to add a server, and the process of adding the server requires several steps. The storage administrator must (1) find out the WWN of the host bus adapter (HBA) where the server will be attached; and (2) add LUN masking based on the HBA WWN. The SAN administrator must (1) select a switch port; (2) find out the HBA WWN; (3) create a Boot LUN zone for the HBA WWN; (4) create a zone with the target device; (5) enable zoning; and (6) define device connection control (DCC) policies, QoS, Traffic Isolation (TI) zones, etc.

Fabric administrators have desired a way to pre-provision fabrics, allowing replacement and addition of servers easily, avoiding the difficulties outlined above.

SUMMARY OF INVENTION

In one embodiment, a method is disclosed. The method comprises associating a first worldwide port name with a fabric port of a first network switch; receiving a second worldwide port name from a user of the first network switch; associating the second worldwide port name with the fabric port; selecting one of the first worldwide port name and the second worldwide port name as a selected worldwide port name; and communicating between a network device connected to the fabric port and other devices in a network switch fabric using the selected worldwide port name.

In a further embodiment, the method further comprises deleting the association of the first worldwide port name with the fabric port.

In another further embodiment, the method further comprises disabling use of the first worldwide port name and the second worldwide port name by the first network switch.

In another further embodiment, selecting one of the first worldwide port name and the second worldwide port name as a selected worldwide port name comprises selecting the second worldwide port name.

In another further embodiment, the method further comprises mapping by the network switch the selected worldwide port name to a predefined name for a node port of the network device; and using the selected worldwide port name instead of the predefined name for communicating across a network fabric comprising the first network switch and the network device.

In another further embodiment, communicating between a network device connected to the fabric port and other devices in a network switch fabric using the selected worldwide port name comprises replacing a predefined worldwide port name of a node port of the network device with the selected worldwide port name in frames received from the network device; and replacing the selected worldwide port name with the predefined worldwide port name in frame destined for the network device.

In another further embodiment, communicating between a network device connected to the fabric port and other devices in a network switch fabric using the selected worldwide port name comprises communicating by the first network switch the selected worldwide port name to the network device responsive to a fabric login request from a node port of the network device.

In a yet further embodiment, communicating between a network device connected to the fabric port and other devices in a network switch fabric using the selected worldwide port name further comprises assigning by the network device the selected worldwide port name to the node port of the network device; and using the selected worldwide port name by the network device instead of a predefined name for the node port of the network device for communicating across the network fabric.

In another yet further embodiment, communicating between a network device connected to the fabric port and other devices in a network switch fabric using the selected worldwide port name further comprises receiving a signature from the network device as part of the fabric login request; and validating the signature before communicating the selected worldwide port name to the network device.

In another further embodiment of the method disclosed above, associating a first worldwide port name with a fabric port of a first network switch comprises deriving the first worldwide port name automatically from a predefined worldwide port name assigned to a chassis comprising the first network switch.

In another further embodiment, the method further comprises deleting the association of the second worldwide port name with the fabric port, wherein selecting one of the first worldwide port name and the second worldwide port name as a selected worldwide port name comprises selecting the first worldwide port name.

In another further embodiment, the method further comprises receiving a request from the network device to assign a worldwide port name to a node port of the network device.

In another further embodiment, the method further comprises verifying that the second worldwide port name is unique across a network fabric; and rejecting the second worldwide port name if it is not unique across the network fabric.

In another further embodiment, associating a first worldwide port name with a fabric port of a first network switch, receiving a second worldwide port name from a user of the first network switch, associating the second worldwide port name with the fabric port, and selecting one of the first worldwide port name and the second worldwide port name as a selected worldwide port name are performed by a second network switch communicatively coupled to the first network switch.

In another further embodiment receiving a second worldwide port name from a user of the first network switch comprises deleting a third worldwide port name associated with a second fabric port of the first network switch from the second fabric port; and receiving the third worldwide port name of the second fabric port as the second worldwide port name.

In another further embodiment, receiving a second worldwide port name from a user of the first network switch comprises deleting a third worldwide port name associated with a fabric port of a second network switch from the fabric port of the second network switch; and receiving the third worldwide port name as the second worldwide port name.

In another embodiment, a method of pre-provisioning a server on a network fabric is disclosed. The method comprises associating a user-specified worldwide port name with a fabric port of a network switch; adding logical unit masking responsive to the user-specified worldwide port name; creating a boot logical unit zone comprising the user-specified worldwide port name; and creating a zone with a target network device including the user-specified worldwide port name.

In another embodiment, a network switch is disclosed. The network switch comprises a processor; an application specific integrated circuit coupled to the processor, comprising a fabric port; and software executed by the processor. The software comprises logic to generate a first worldwide port name; logic to associate with the first worldwide port name the fabric port; logic to receive a second worldwide port name; logic to associate the second worldwide port name with the fabric port; logic to select one of the first worldwide port name and the second worldwide port name as a selected worldwide port name; and logic to communicate between a network device connected to the fabric port and other devices in a network switch fabric using the selected worldwide port name.

In a further embodiment, the logic to communicate between a network device connected to the fabric port and other devices in a network switch fabric using the selected worldwide port name comprises logic to replace a predefined worldwide port name of a node port of the network device with the selected worldwide port name in frames received from the network device; and logic to replace the selected worldwide port name with the predefined worldwide port name in frames destined for the network device.

In another further embodiment, the logic to communicate between a network device connected to the fabric port and other devices in a network switch fabric using the selected worldwide port name comprises logic to communicate via the fabric port the selected worldwide port name to the network device responsive to a fabric login request received by the fabric port from a node port of the network device.

In a yet further embodiment, the application specific integrated circuit further comprises a node port, and the software executed by the processor further comprises logic to communicate with a fabric port of another network switch using a node port identifier virtualization protocol.

In another yet further embodiment the software further comprises logic to validate a signature received from the network device before communicating the selected worldwide port name to the network device.

In another further embodiment of the network switch, the logic to associate a first worldwide port name with a fabric port of a first network switch automatically comprises logic to derive the first worldwide port name automatically from a predefined worldwide port name assigned to the network switch.

In another further embodiment the software further comprises logic to delete the association of the first worldwide port name with the fabric port; and logic to delete the association of the second worldwide port name with the fabric port.

In another further embodiment, the software further comprises logic to disable the logic to communicate between a network device connected to the fabric port and other devices in a network switch fabric using the selected worldwide port name.

In another further embodiment, the application specific integrated circuit comprises a second fabric port, and the software further comprises logic to move the association of the selected worldwide port name from the fabric port to the second fabric port.

In another further embodiment, the logic to receive a second worldwide port name receives the second worldwide port name from a user of the network switch.

In another embodiment, a non-transitory storage medium is disclosed. Instructions are stored on the storage medium that when executed by a network switch, cause the network switch to perform actions, comprising associating a first worldwide port name with a fabric port of a network switch; receiving a second worldwide port name from a user of the network switch; associating the second worldwide port name with the fabric port; selecting one of the first worldwide port name and the second worldwide port name as a selected worldwide port name; and communicating by the network switch the selected worldwide port name to a network device responsive to a fabric login request from a node port of the network device.

In another embodiment, a system is disclosed. The system comprises a gateway switch, comprising a processor; an application specific integrated circuit coupled to the processor, comprising a node port; and a fabric port; and a network switch, coupled to the gateway switch, comprising a processor; an application specific integrated circuit coupled to the processor, comprising a fabric port, wherein the node port of the gateway switch connects to the fabric port of the network switch; and software executed by the processor of the network switch, comprising logic to generate a first worldwide port name; logic to associate the first worldwide port name with the fabric port of the gateway switch; logic to receive a second worldwide port name; logic to associate the second worldwide port name with the fabric port of the gateway switch; logic to select one of the first worldwide port name and the second worldwide port name as a selected worldwide port name; logic to associate the selected worldwide port name with a node port of a network device connected to the gateway switch upon receipt of a fabric login request from the network device by the gateway switch; and logic to communicate via the fabric port of the network switch using the selected worldwide port name.

In another embodiment, a system is disclosed. The system comprises a network switch; a processor; an application specific integrated circuit coupled to the processor, comprising a fabric port; and software executed by the processor, comprising logic to generate a first worldwide port name; logic to associate with the first worldwide port name the fabric port; logic to receive a second worldwide port name; logic to associate the second worldwide port name with the fabric port; logic to select one of the first worldwide port name and the second worldwide port name as a selected worldwide port name; and logic to communicate via the fabric port using the selected worldwide port name; and a host bus adapter, configured to connect a plurality of virtual machines to the fabric port of the network switch via a single connection between the host bus adapter and the network switch, wherein the selected worldwide port name is associated with a virtual machine of the plurality of virtual machines.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the description below is written in terms of Fibre Channel protocols and fabrics, the present invention is not so limited, and may be used with any network protocols and fabrics that employ globally unique identifiers associated with elements of the network fabric. In particular, embodiments may employ Fibre Channel over Ethernet (FCoE) encapsulation of FC frames over Ethernet networks. For example, references to HBAs in the following should be understood to include Converged Network Adapters (CNAs) that contain both FC HBA and Ethernet network interface card functionality on the same adapter card.

By using virtual PWWNs (VPWWNs) to pre-provision a network fabric, many of the administrative headaches of conventional FC fabrics may be reduced or eliminated.

Figure 1:
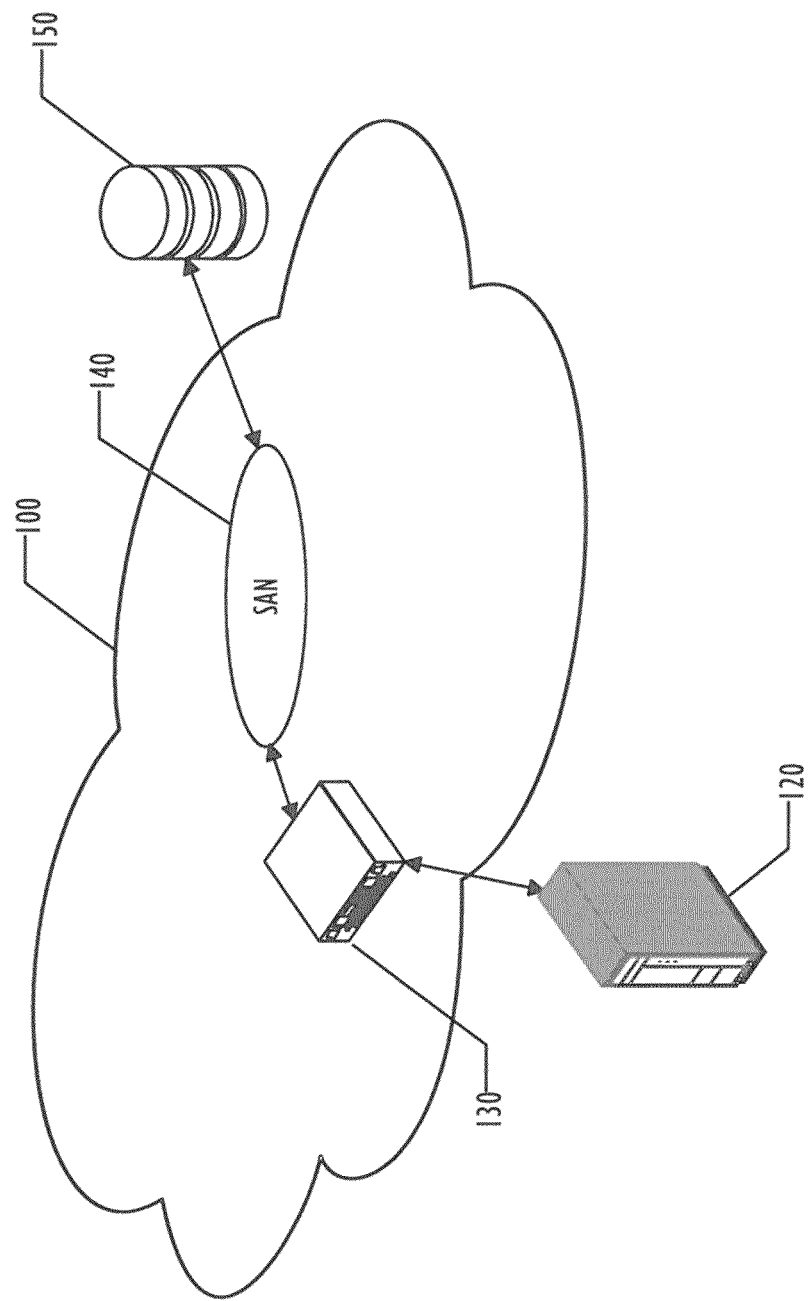
FIG. 1 is a block diagram illustrating a user case of VPWWNs according to one embodiment.
Figure 2:
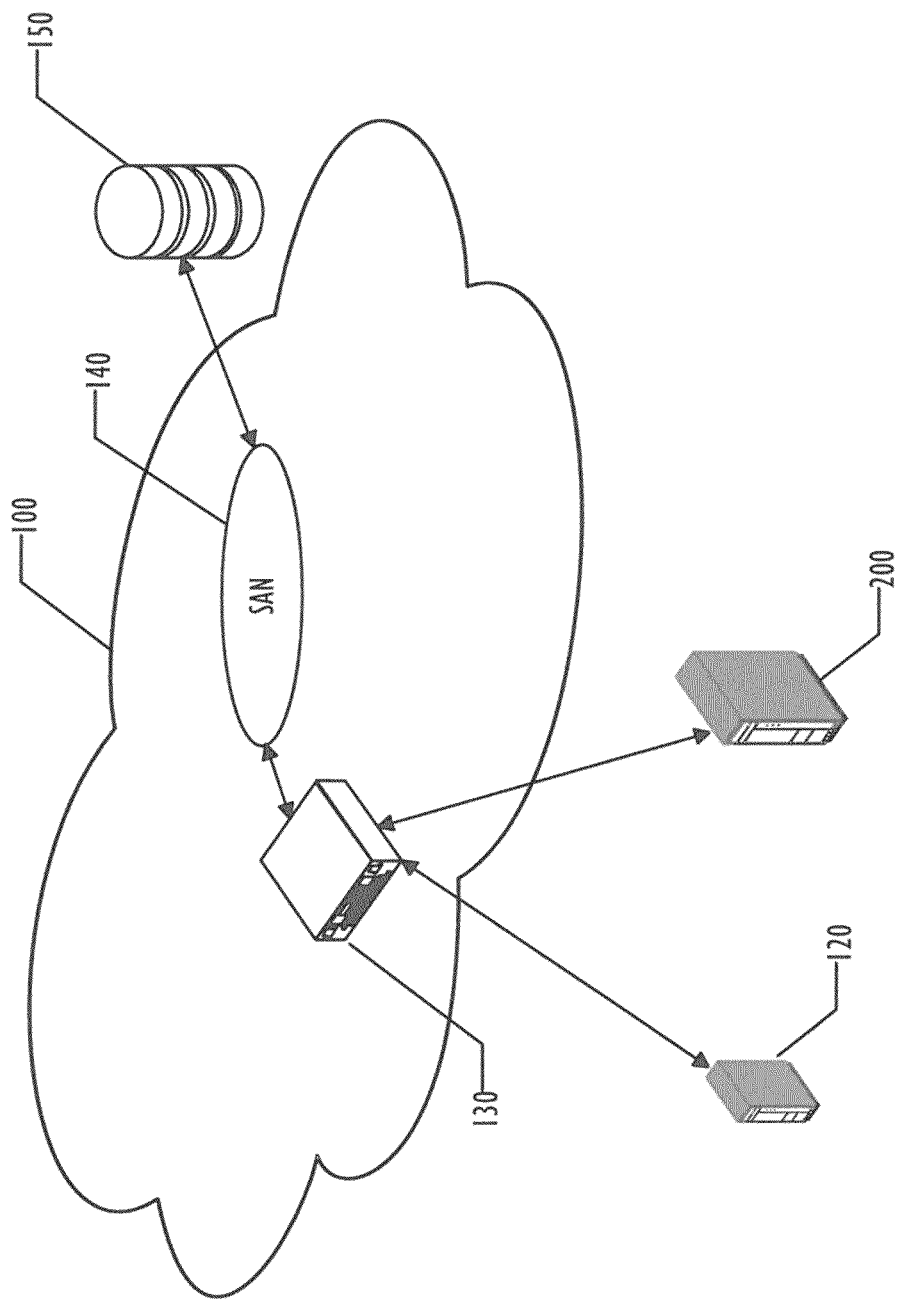
FIG. 2 is a block diagram illustrating a use case of replacing a server according to one embodiment.

FIG. 1 is a block diagram illustrating a use case of VPWWNs, in which a new server 120 is added to a fabric 100. An administrator has pre-provisioned the SAN 140 and the switch port of the switch 130 to which the server is to be attached. The server 120 can then simply be assigned a pre-provisioned VPWWN associated with the switch port and then use the VPWWN for communicating with (for example) the JBOD (just a bunch of discs) 150. FIG. 2 is a follow-on example, illustrating a situation in which server 120 fails sometime after it has been attached to the fabric 100. The server 120 may be unplugged from the switch port and replacement server 200 plugged into the same switch port of switch 130. The new server starts working seamlessly, using the same VPWWN provisioned for the switch port.

Figure 3:
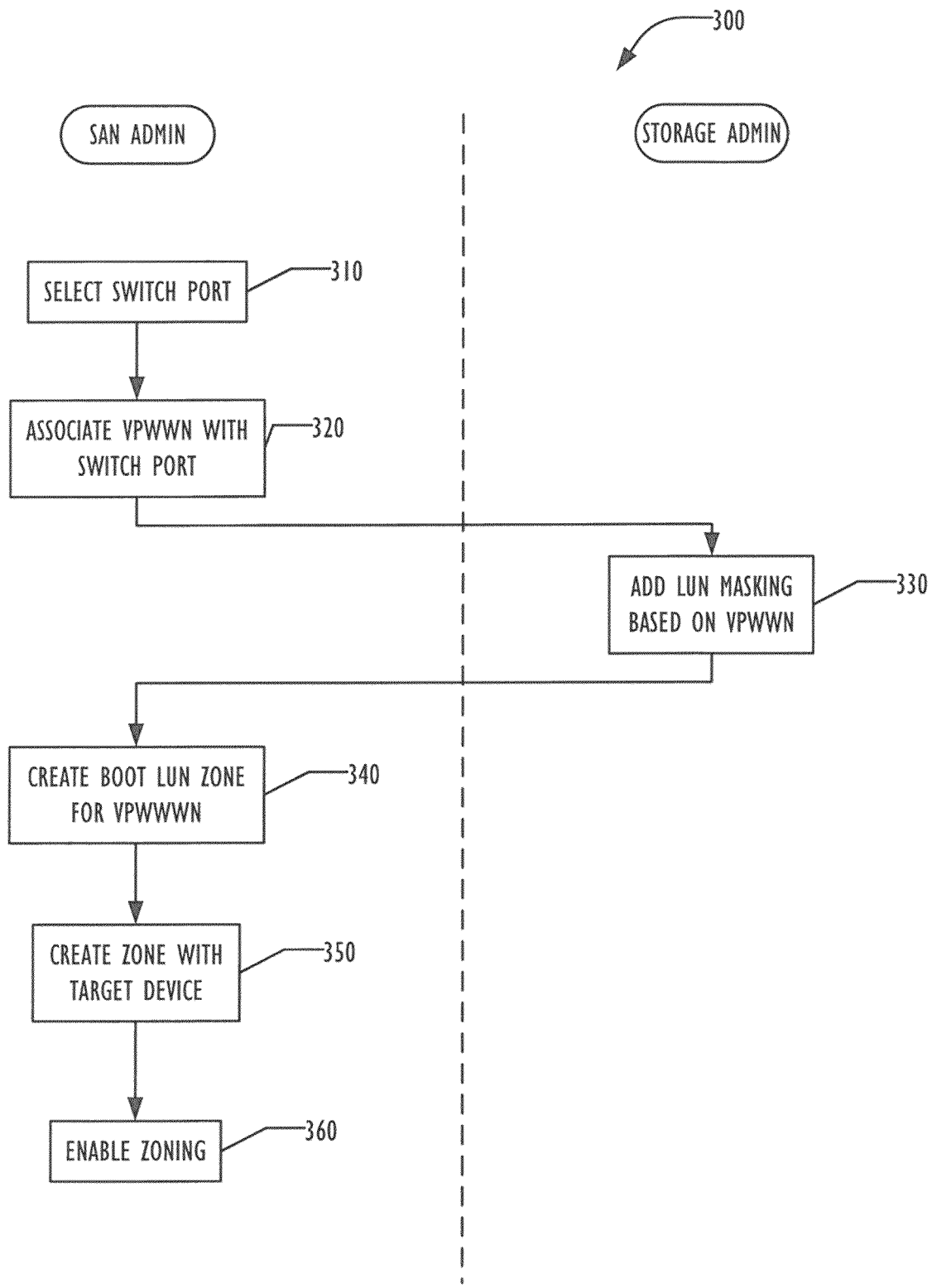
FIG. 3 is a flowchart illustrating basic steps for provisioning a fabric with a VPWWN according to one embodiment.

FIG. 3 is a flowchart 300 illustrating basic steps for provisioning a fabric with a VPWWN. The techniques described allow creation of a pre-provisioned SAN, with several switch ports pre-provisioned in the SAN as a one-time procedure. After pre-provisioning, an administrator may add and replace servers easily and quickly at any time. As illustrated in FIG. 3, in block 310 a SAN administrator selects an F_port of a switch. Then in block 320 the VPWWN is associated with the F_port of the switch. In block 330, a storage administrator (who may be the same person as the SAN administrator) adds LUN masking based on the VPWWN. In block 340, the SAN administrator then creates a Boot LUN zone for the VPWWN. A zone is created with the target device in block 350, and zoning is enabled in block 360. At a later time, a server may then connect to the F_port of the switch and receive the VPWWN associated with the F_port of the switch as the WWN for the server's N_port. By pre-provisioning the SAN based on VPWWNs, many of the problems associated with adding servers to conventional fabrics may be reduced or eliminated.

A PWWN virtualizing feature provides the facility to hide the real PWWNs of the devices, and use a VPWWN provided by the admin. The binding may be "per logical switch-wide," but the uniqueness of the VPWWN may be enforced chassis-wide, using a chassis-wide database of VPWWN to port associations to help enforce the uniqueness within the fabric of the VPWWNs.

In one embodiment, a VPWWN may be automatically provisioned and associated with an F_port, referred to herein as a default VPWWN. In addition, a user may select and associate a user VPWWN with the same port. In one embodiment, a user VPWWN takes precedence over a default VPWWN if both are available for a port. Thus the switch port provides the user VPWWN to an HBA of a device logging into the port if both the user and default VPWWNs are available for the port.

In another embodiment, either of the default or user VPWWNs may be provided to a device logging into the port, depending on a configuration option setting.

In one embodiment, a user may delete one or both of the default and user VPWWNs associated with a port. In addition, a user may move one of the default or user VPWWNs to a different port as a user VPWWN, where the different port may be a port of the same FC switch or a port of a different switch in the switch fabric.

Some vendors provide gateway devices that provide access to a switch through N_Port ID Virtualization (NPIV). For example, the assignee of the present application provides a device designated as an Access Gateway. In such an embodiment, VPWWNs may be associated with F_ports of the gateway devices. As with VPWWNs associated with non-gateway switch ports, a user may move and delete the default and user VPWWNs associated with ports of NPIV gateway devices.

In one embodiment, the switch 130 pushes the VPWWN to an HBA of a connected device only if the HBA informs the switch 130 that it supports dynamic WWN acquisition through a dynamic WWN acquisition protocol. In such an embodiment, the HBA, as part of the fabric login, indicates that it is capable of supporting a VPWWN, and the network switch only sends the VPWWN if that indication is received. Once the VPWWN is received, the HBA uses the VPWWN in lieu of its predefined WWN for communication with the fabric.

In switches that can be partitioned into logical switches, in one embodiment, the VPWWN to switch port association is limited within the boundary of the logical switch.

In one embodiment, the ability to provide VPWWNs to HBAs may be disabled and enabled, typically through a command line interface (CLI), although any desired type of user interface may be used. If the user disables the feature, then the switch port may not push the VPWWN (even if a default or user VPWWN is available) to the HBA even if the HBA requests a VPWWN.

In one embodiment, if VPWWN use is disabled on a port, the default and user VPWWNs are retained so that if VPWWN usage is re-enabled, the previously associated VPWWNs may be usable. In one embodiment, VPWWNs may be associated with a port and deleted or moved to another port regardless of whether use of the VPWWNs is enabled or disabled on that port.

Figure 4:
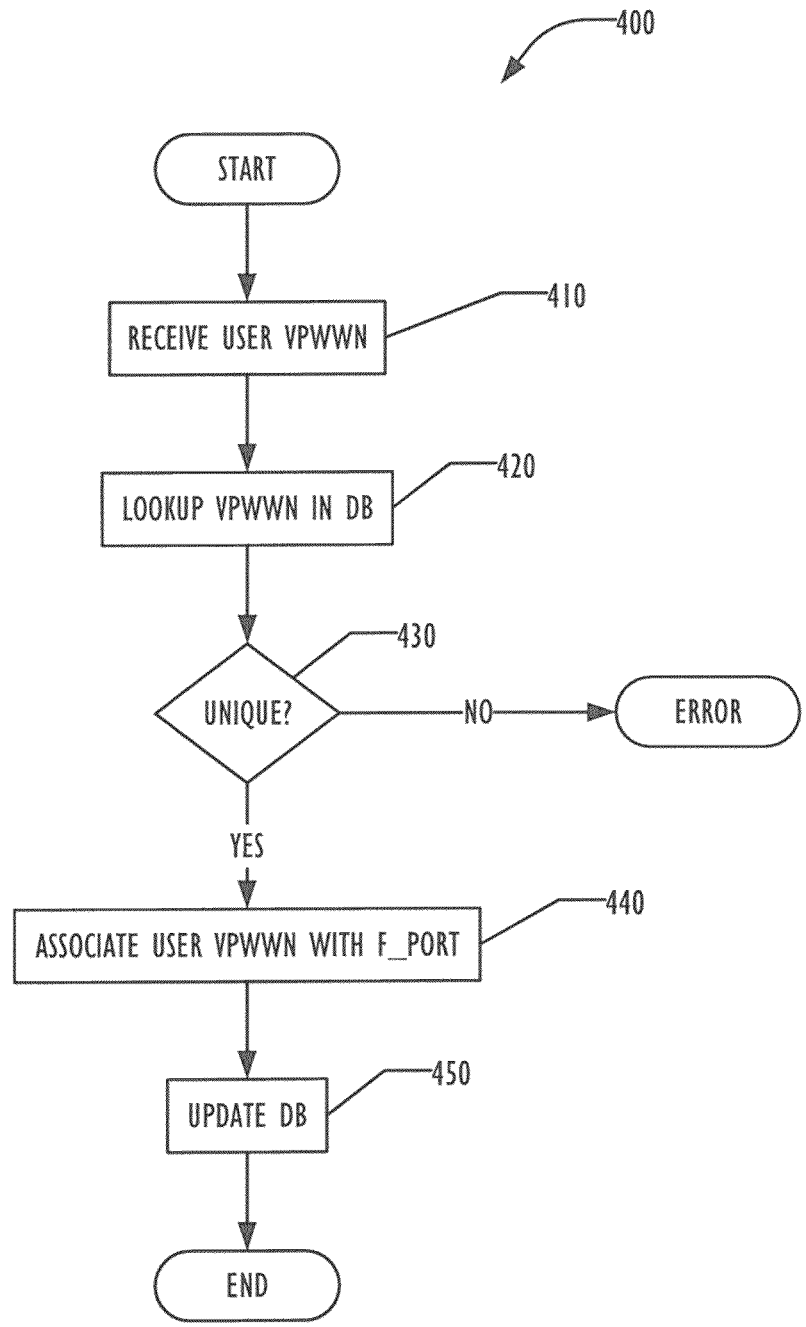
FIG. 4 is a flowchart illustrating a technique for associating a VPWWN with an F_port according to one embodiment.

FIG. 4 is a flowchart according to one embodiment illustrating a technique for associating a user-specified VPWWN with an F_port of a network switch, such as the network switch 130 of FIG. 1. In block 410, a user-specified VPWWN is received, typically via a CLI command. In block 420, the VPWWN is checked in a database of user VPWWNs and ports. If in block 430 the new VPWWN is found in the database, then an error condition is signaled and the new VPWWN is rejected. Otherwise, the new VPWWN is associated with the F_port in block 440 and added to the database in block 450. The database may be any form of database or data structure allowing lookup and updating that may be accessible to the fabric operating system of the network switch 130, and is typically maintained in memory of a processor subsystem for the switch 130, described in more detail below in the discussion of FIG. 6.

In one embodiment, when a user-specified VPWWN is received, if no default VPWWN is associated with the port, then a default VPWWN is created prior to associating the user-specified VPWWN with the port.

The HBA can request the switch to assign a VPWWN if the HBA has the ability to support dynamic PWWN assignment. This may be through a fabric login request (FLOGI) or any other desired communication between the HBA and the switch. The switch may push the VPWWN to the HBA if an association exists between the switch port to which the HBA is connected and the VPWWN. In one embodiment, the VPWWN is pushed to the HBA by including the VPWWN in the FLOGI ACCEPT; other embodiments may use other techniques for pushing the VPWWN to the HBA. The HBA preferably persists the VPWWN which the switch pushed to it.

Figure 5:
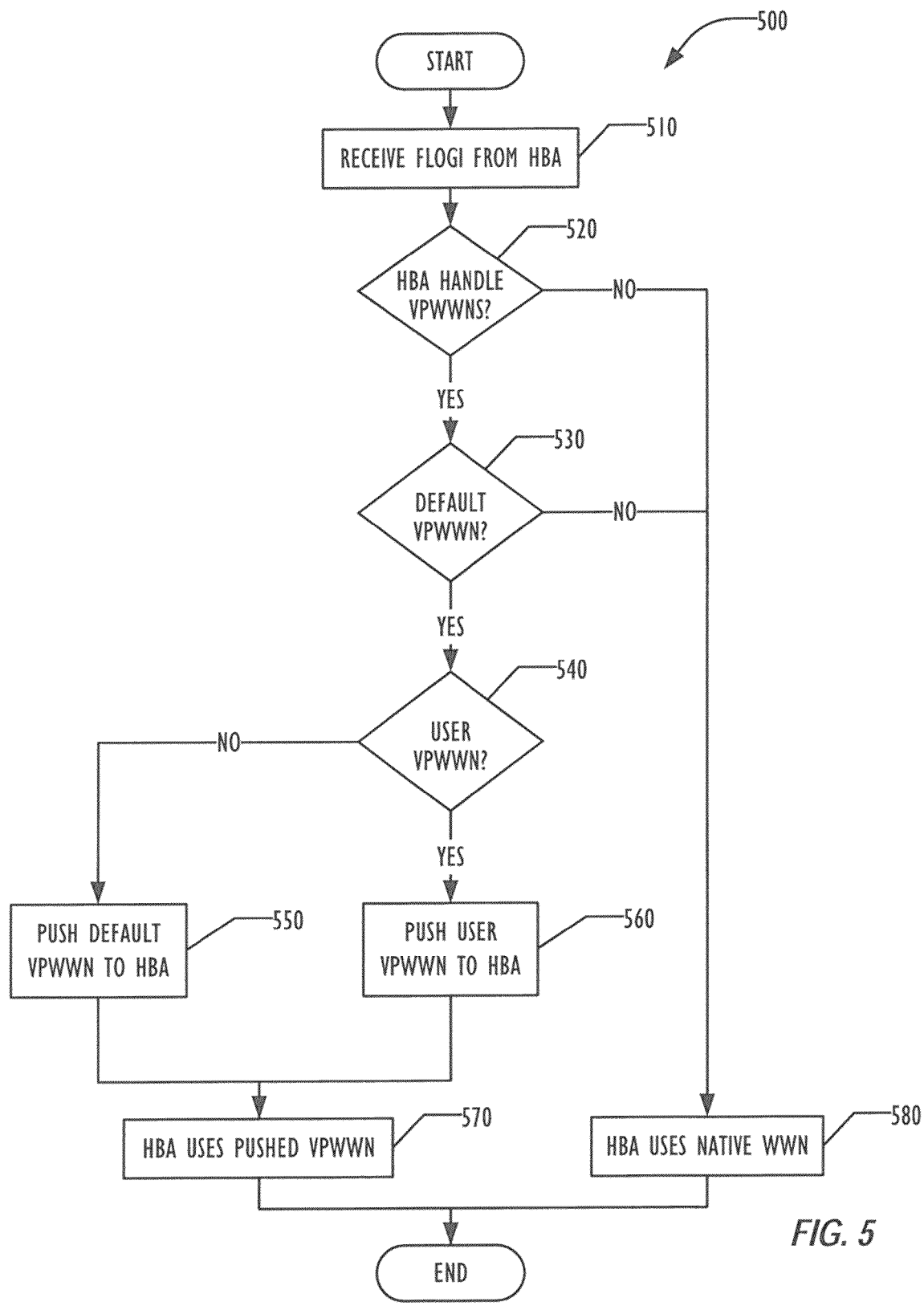
FIG. 5 is a flowchart illustrating a technique for pushing a VPWWN to an HBA according to one embodiment.

FIG. 5 is a flowchart illustrating a technique for pushing a VPWWN to an HBA according to one embodiment. In block 510, the F_port of switch 130 receives an FLOGI from the N_port of the HBA connected to the F_port. In block 520, the FLOGI request is checked to determine whether it indicates that the HBA is capable of dynamically updating the PWWN for its N_port. If the HBA is not capable, then in block 580 the HBA will use the predefined native N_port PWWN for communication with the network switch fabric. If the HBA is capable, then in block 530 the switch 130 determines whether a default VPWWN is associated with the F_port. If not, which indicates that neither a default VPWWN nor a user VPWWN is available, then an FLOGI ACCEPT is sent to the HBA and in block 580 the HBA continues to use the predefined native PWWN.

If a default VPWWN has been associated with the F_port, then in block 540 the availability of a user VPWWN is checked. If a user VPWWN is associated with the F_port, then in block 560 the user VPWWN is pushed to the HBA in an FLOGI ACCEPT response. If no user VPWWN is available, the default VPWWN is pushed instead in block 550 in an FLOGI ACCEPT response. The FLOGI ACCEPT is sent to the HBA with the VPWWN and the HBA in block 570 then uses the dynamically assigned VPWWN for communicating with the network fabric.

In one embodiment, an HBA that logins into an NPIV connected gateway device may use a similar technique to ask for the VPWWN from the gateway as part of the FLOGI. The gateway may convert the FLOGI from the HBA into a Fabric Discovery request (FDISC), and embed the gateway F_port to which the HBA connected in the FDISC request, passing on the FDISC to a network switch. The network switch may then check if any VPWWN (default or user) exists for that port of the gateway, and will return the VPWWN as part of the FDISC response to the gateway if any VPWWN is associated with the F_port of the gateway, selecting between the default and user VPWWNs as described above. The gateway may then forward the FDISC response to the HBA after appropriate translations, allowing the HBA to use the VPWWN for that session.

An administrator may create zones using VPWWNs even before the servers and devices that are to use those VPWWNs are connected to the switches (thus, before they are exposed to the SAN network). Access control lists (ACLs), for example LUN masking, may be configured on targets in the zone even without the actual devices that are to use the VPWWNs being present in the network. Thus, the administrator may pre-provision the SAN based on VPWWNs, without knowing the physical PWWNs of the devices that eventually be attached to the FC switches.

Boot LUN zones may be pre-created by using the VPWWNs. The VPWWN is associated with a switch port so that any device that comes on that port may acquire the VPWWN, and henceforth may boot from any of the devices that are present in the boot LUNs. ACLs may also be pre-defined in the targets of the boot LUNs, so that server booting becomes plug and play. By pre-provisioning switch ports using VPWWNs, the switch ports can be configured as a "Solaris bootable port," a "Linux bootable port," etc.

Migration of servers across ports may be allowed by support for moving the association of user and default VPWWNs from one port to the other, which helps make the server migration seamless.

The PWWN virtualization may be done either with the support of the HBA, as described above, or purely through an operating system for the network switch fabric (FOS). These embodiments are described herein as an HBA-assisted embodiment and an FOS embodiment. In an FOS embodiment, instead of pushing the VPWWN to the HBA, the VPWWN is mapped by the F_port of the switch, allowing HBAs that do not support dynamic WWN assignment to use the VPWWN transparently to the HBA. In an FOS embodiment, the HBA performs the FLOGI with its predefined PWWN, and continues to use that PWWN when communicating across the network switch fabric. Instead of pushing the VPWWN to the HBA, the switch maps the HBA's physical PWWN to the VPWWN associated with the switch port, translating frames as necessary to replace the physical PWWN of the HBA with the VPWWN. In an HBA embodiment, the HBA preferably retains the VPWWN when disconnected from the F_port of the network switch, but the VPWWN may not be retained across reboots.

In an FOS PWWN virtualization embodiment, the fabric may automatically track the VPWWN to physical PWWN mapping, allowing the HBA to be disconnected from one switch in the fabric and moved to another switch in the fabric, as discussed below in the description of FIG. 8.

HBA-assisted and FOS virtualization embodiments may perform the initial association of a VPWWN with a switch port in the way described above. The differences may arise after an HBA connects to a switch port with which a VPWWN is associated. In HBA-assisted embodiments, the VPWWN is pushed to the HBA, which modifies itself to use the VPWWN instead of its native PWWN. In FOS embodiments, the VPWWN is not pushed to the HBA, which continues to use its native PWWN, but the FOS maps the PWWN to the VPWWN and translates frames as part of frame handling procedures in the switch.

In one embodiment, the network switch manages a plurality of default VPWWNs that are derived from a reserved chassis WWN. A chassis may have one or more reserved WWNs that may be used as the basis for the default VPWWNs. In an HBA-assisted embodiment, the VPWWN may then be communicated to the HBA if the HBA requests a VPWWN, provided the switch has a VPWWN association available for the given switch port. In an FOS embodiment, the PWWN supplied to the switch is mapped to the VPWWN; the HBA remains unaware of the VPWWN.

Administrators may be provided with an interface to create, manage, and delete a database of VPWWNs for the chassis. The interface may be of any type, including graphical user interfaces and command line interfaces. In one embodiment, the administrators are provided with interfaces to (a) associate a switch port with a default or user VPWWN; (b) associate an NPIV-connected gateway port with a default or user VPWWN; (c) delete any existing associations; (d) move the VPWWNs from one port to another port; (e) move the association of VPWWNs from one NPIV-connected gateway device to another gateway device; (f) provide info about the association; (g) enable or disable the VPWWN assignment to an HBA; and (h) provide support to a management software application to integrate VPWWNs into the management software application. In one embodiment, integration of VPWWNs into a management software application may be provided through a set of APIs exported to the management software application.

A command may be provided to associate a user-specified VPWWN with a switch port, adding a new default VPWWN if the port does not currently have a default VPWWN. The uniqueness of the VPWWN will be enforced chassis-wide, returning an error if the VPWWN is already assigned elsewhere on the network chassis. This command may also enable use of VPWWNs on the port if use was earlier disabled. In one embodiment, a user-specified VPWWN may not be associated with a port currently having a user-specified VPWWN without first deleting the previous user VPWWN. In other embodiments, the previous user VPWWN may be automatically replaced by assigning a new one.

In some embodiments, some switch features or statuses may conflict with the use of VPWWNs, in which case, the assignment may be prohibited. For example, assignment of a VPWWN may be prohibited unless the port is in a disabled state.

In embodiments supporting NPIV gateway devices, ports on the gateway device may be associated with a VPWWN for use with HBAs connecting to that gateway port. The VPWWN may be derived from a WWN assigned to the gateway device, or a user may specify a user VPWWN, as with a non-gateway device. In one embodiment, the association of VPWWNs to gateway ports is performed by another FC switch to which the gateway device is connected, rather than by the gateway itself, and the gateway device uses an FDISC request to the FC switch to obtain the VPWWN that should be pushed to an HBA connecting to a gateway device F_port.

In one embodiment, the VPWWN may take effect only on the next login session on a gateway port, because the gateway ports are not under the control of the FC switch and cannot be disabled or enabled by the FC switch.

In one embodiment, VPWWN use may be enabled or disabled on a port basis. If a VPWWN has previously been defined for the port, the VPWWN configuration of the port may be preserved even if VPWWN use is disabled on that port, or if the port is moved to a different logical switch. The existing configuration may then be reapplied on the port once VPWWN usage is (re)enabled. In one embodiment, if no VPWWN configuration is available for a port when VPW- WNs are enabled, the switch may automatically associate a default VPWWN with the port.

Even when VPWWN use is disabled on a port, in one HBA-assisted embodiment, an HBA may persist in using an assigned VPWWN after receiving the VPWWN from the port. In such an embodiment, the switch may reject the F_login of the HBA if it uses a stale VPWWN. Similarly, in one FOS embodiment, a VPWWN associated with a port that has been mapped to a physical PWWN of an HBA may remain mapped to that PWWN even while the switch port is disabled from using VPWWNs. In other embodiments, disabling use of VPWWNs on a port in an HBA-assisted embodiment may cause the port to request the HBA to stop using the VPWWN; similarly, disabling use of VPWWNs on a port in an FOS embodiment may delete the mapping between VPWWNs and physical PWWNs that was made upon a connection to that port.

If features that conflict with VPWWN usage are enabled on the port, enabling VPWWN usage may fail. When a port is moved into a logical switch, VPWWN usage may be disabled on that port, even though if the logical switch already has the VPWWN configurations for the port, those configurations may remain. In one embodiment, a port should be in a disabled state before changing the VPWWN association(s) of that port and before disabling or enabling the use of VPWWNs by that port.

In one embodiment, deleting a user VPWWN associated with a port may leave the default VPWWN association capable of being used. In one embodiment, VPWWN processing may be automatically disabled on a port if no active VPWWNs are available for that port.

In one embodiment, a default VPWWN associated with a source port cannot be moved to destination port if a user VPWWN is associated with the source port. In such an embodiment, moving a default VPWWN associated with the source port (which can only be done when no user VPWWN exists for the source port) may cause VPWWN usage on that port to be disabled, because neither default nor user VPWWNs are associated with the source port after the move.

In one embodiment, a default or user VPWWN may be moved from a source port to a destination port as the user VPWWN for the destination port. Any existing user VPWWN for the destination port is deleted. The VPWWN moved from the source port is first removed, to preserve uniqueness. If the default VPWWN is moved from the source port, VPWWN usage on the source port may be disabled, and may be re-enabled on the source port by associating a new default VPWWN with the source port.

In one embodiment, if an administrator requests moving a VPWWN from a port of one NPIV-connected gateway to a port of a different gateway, the system may move the active VPWWN (the default VPWWN or, if present, the user VPWWN) from the source gateway port to the destination gateway port. The destination gateway port should not have the user VPWWN in its VPWWN-port database, because the active VPWWN of the source port is moved as a user VPWWN to the destination port.

A command may be provided to display the default and user VPWWN assignments for a given port or port range or all ports in the physical or logical switch. If the VPWWN type (default or user) is not specified, the switch may display active VPWWN associations for the given port range or all ports in the logical switch. The output from the command may be of any desired format.

In one embodiment, configuration download and upload utilities may be provided to export and import VPWWN configuration files.

Although default VPWWNs can be guaranteed unique within a fabric based on the technique for generating them from a chassis reserved WWN, user VPWWNs may not be unique. In one embodiment, a VPWWN database may be provided to manage user VPWWNs, to help ensure they are unique. Before associating a user VPWWN with a port, the switch may search the database to avoid duplication, refusing the assignment if an existing association of that VPWWN with a port is found, as illustrated in FIG. 4. In one embodiment, an attempted assignment of any VPWWN (default or user) may be rejected if the VPWWN is found in either the VPWWN database or the name server database.

In one embodiment, the name server database may also inform the VPWWN database of new devices in the fabric. The VPWWN database may then temporarily mark the device ports as in use, and refuse to assign VPWWNs to the ports of the device until the device ports are disabled.

Figure 6:
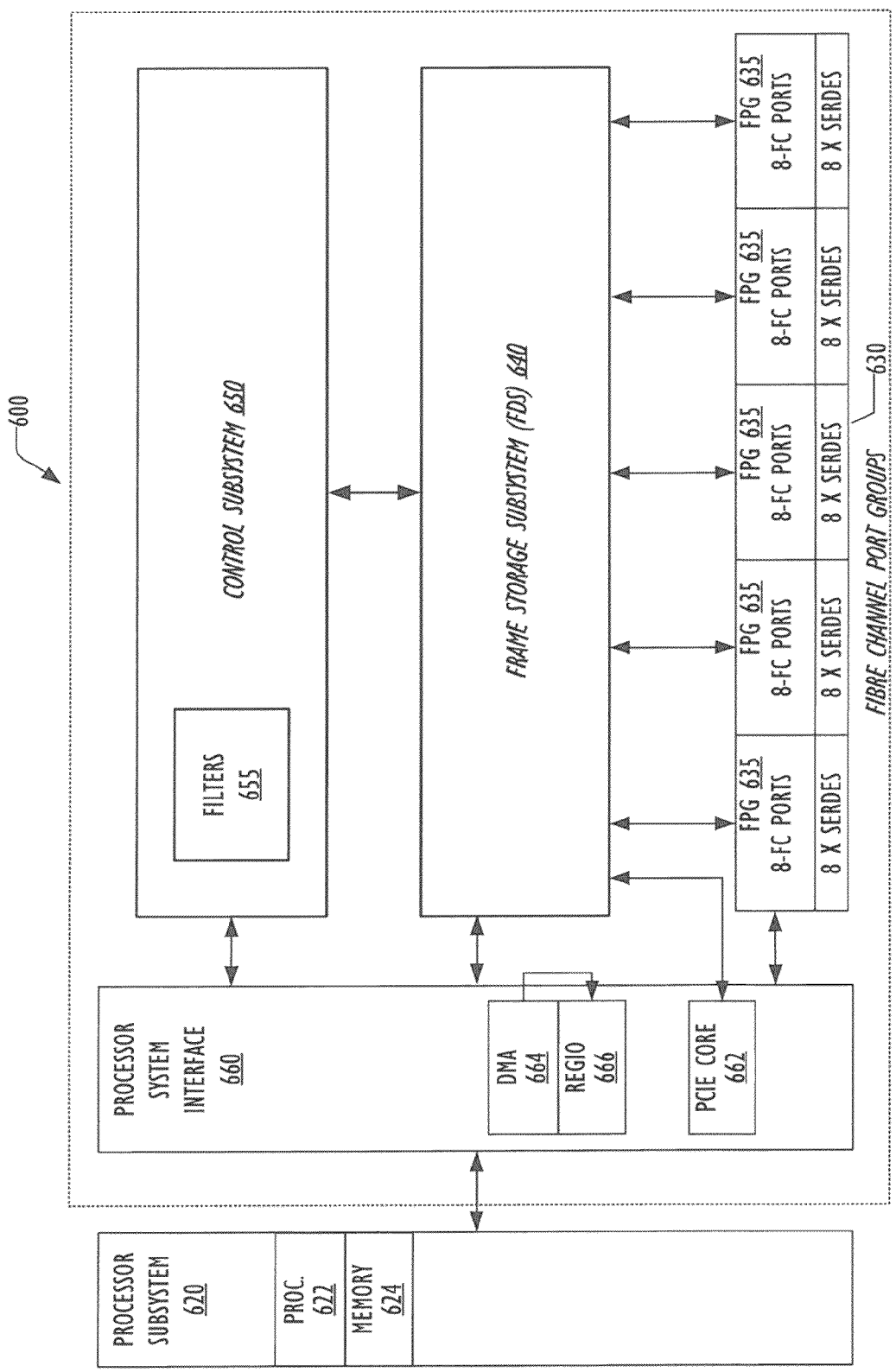
FIG. 6 is a block diagram illustrating a network switch according to one embodiment.

In one embodiment illustrated in FIG. 6, an example hardware functionality for the VPWWN features described above is implemented as a 40-port Fibre Channel switch ASIC 610 that is combinable with a processor subsystem 620 to provide a complete 40-port Fibre Channel network switch 600. Multiple ASICs 610 can be arranged in various topologies to provide higher port count, modular switch chassis. The ASIC 610 and processor subsystem 620 are illustrative and by way of example only, and other hardware implementations can be used as desired.

The ASIC 610 comprises four major subsystems at the top-level as shown in FIG. 6: a Fibre Channel Protocol Group Subsystem 630, a Frame Data Storage Subsystem 640, a Control Subsystem 650, and a Processor System Interface 660. Some features of the ASIC 610 that are not relevant to the current discussion have been omitted for clarity of the drawing.

The Fibre Channel Protocol Group (FPG) Subsystem 630 comprises 5 FPG blocks 635, each of which contains 8 port and SERDES logic blocks to a total of 40 E, F, and FL ports.

The Frame Data Storage (FDS) Subsystem 640 contains the centralized frame buffer memory and associated data path and control logic for the ASIC 610.

The Processor System Interface 660 provides the processor subsystem 620 with a programming interface to the ASIC 610. It includes a Peripheral Component Interconnect Express (PCIe) Core 662, a DMA engine 664 to deliver frames and statistics to and from the processor, and a top-level register interface block 666. As illustrated in FIG. 6, the ASIC 610 is connected to the Processor Subsystem 620 via a PCIe link controlled by the PCIe Core 662, but other architectures for connecting the ASIC 610 to the Processor Subsystem 620 can be used.

Some functionality described above can be implemented as software modules in an operating system or application running on a processor 622 of the processor subsystem 620 and stored in a memory 624 or other storage medium of the processor subsystem 620. This software may be provided during manufacture of the switch chassis 600, or provided on any desired computer-readable medium, such as an optical disc, and loaded into the switch chassis 600 at any desired time thereafter. This typically includes functionality such as the software that allows the creation and management of VPWWNs that are associated with ports of the ASIC 610, as well as user interface functions, such as a command line interface for management of the switch chassis 600.

In one embodiment, the control subsystem 650 is configured by operating system software of the network switch 600 executing in the processor 622 of the processor subsystem 620. As indicated above, the VPWWN-port database may be stored in memory 624 or in any other location accessible to the processor subsystem 620. In an FOS embodiment, filters logic 655 may be maintained in the control subsystem 650 that can filter for frames containing PWWNs (physical or virtual) and pass such frames to the processor subsystem 620, which may then translate physical PWWNs to VPWWNs in those frames as necessary before passing the frames back to the control subsystem 650 for normal processing of those frames.

Figure 7:
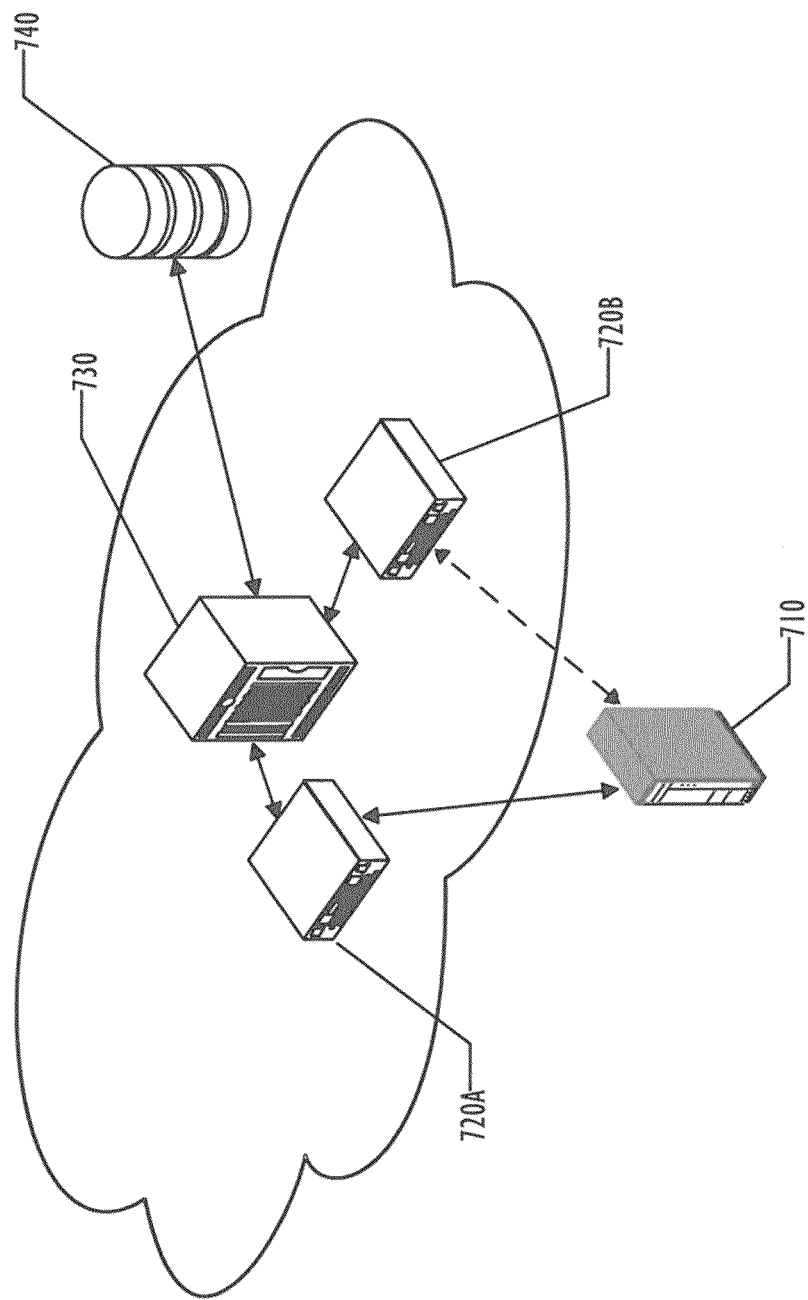
FIG. 7 is a block diagram illustrating moving a server from one gateway switch to another according to one embodiment.

FIG. 7 is a block diagram illustrating an example of moving a host from one NPIV gateway device to another. In this example, host 710 is initially connected via gateway device 720A. Host 710 communicates with JBOD 740 using a VPWWN, in this example in an HBA-assisted embodiment, as described above. An administrator has created zones based on the VPWWN and created a LUN masking for JBOD 740 using the VPWWN. Now the host 710 is to be moved to connect with gateway 720B, for example, because of some failure of gateway 720A. An administrator at switch 730 may move the VPWWN association from the port of gateway 720A to which host 710 is connected to a port of gateway 720B, as described above. Host 710 can now connect to that port of gateway 720B, and resume communication with JBOD 740, without having to reconfigure the LUN masking for the JBOD 740.

Figure 8:
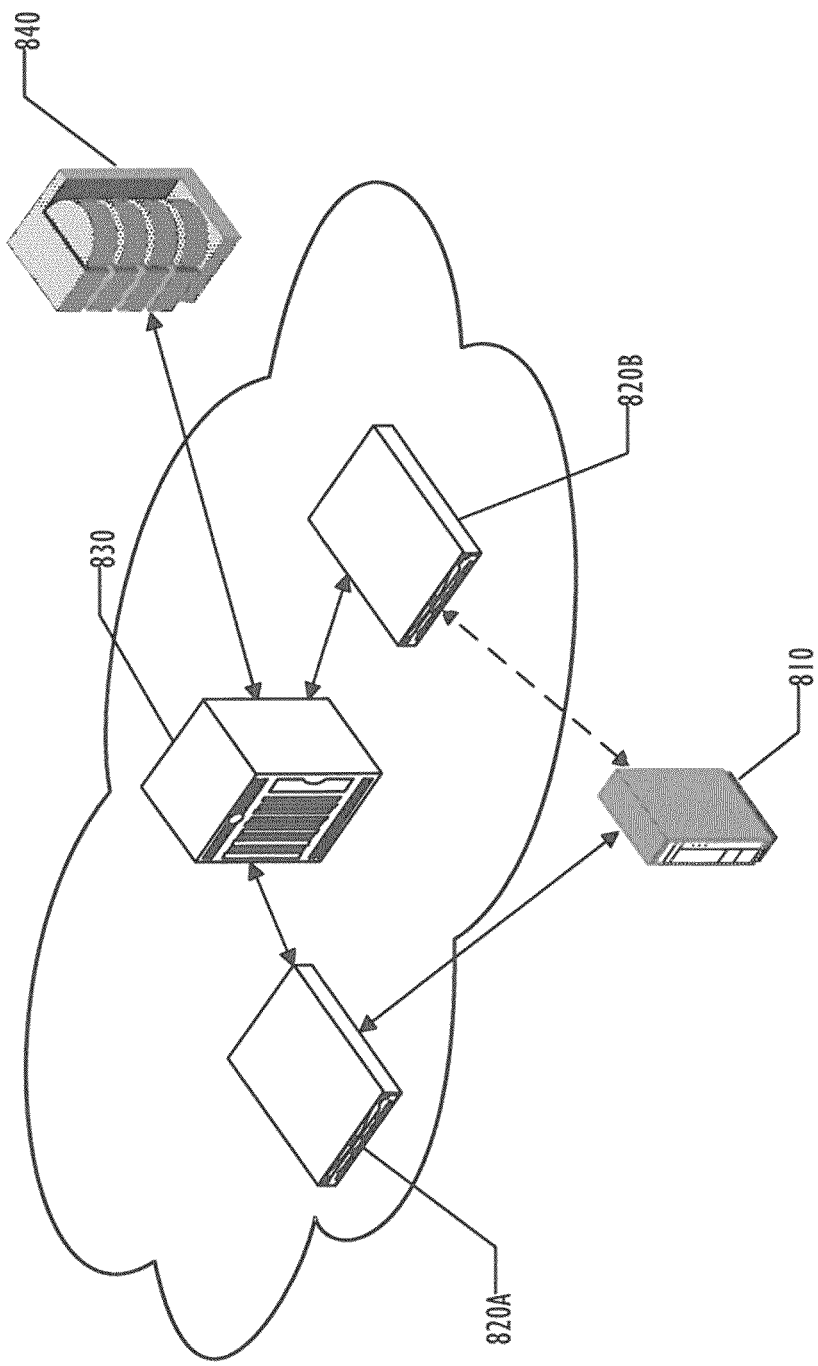
FIG. 8 is a block diagram illustrating moving a server from one fabric switch to another according to one embodiment.

FIG. 8 is a block diagram illustrating an example of moving a host from one switch in a fabric to another in an FOS embodiment. Similar to the HBA-assisted embodiment of FIG. 7, the host 810 has initially connected to switch 820A. A VPWWN initially associated with the port of switch 820A is mapped to the PWWN of the HBA of host 810, and that mapping made known throughout the fabric to switches 820A and 820B. As in the example of FIG. 7, an administrator has created zones based on the VPWWN and created a LUN masking for RAID array 840 using the VPWWN. The host 810 is then moved to connect via switch 820B. Because this is an FOS embodiment, the mapping of the VPWWN to the PWWN of the HBA of the host 810 automatically allows simply reconnecting the HBA of host 810 to a port of switch 820B; the FOS controlling the various switches illustrated in FIG. 8 recognizes the PWWN of host 810, discovers it is mapped to the VPWWN, and maps communications between the host 810 across the switch fabric and the RAID array 840 automatically. No manual configuration changes to either switch 820B or RAID array 840 are required in this example.

Figure 9:
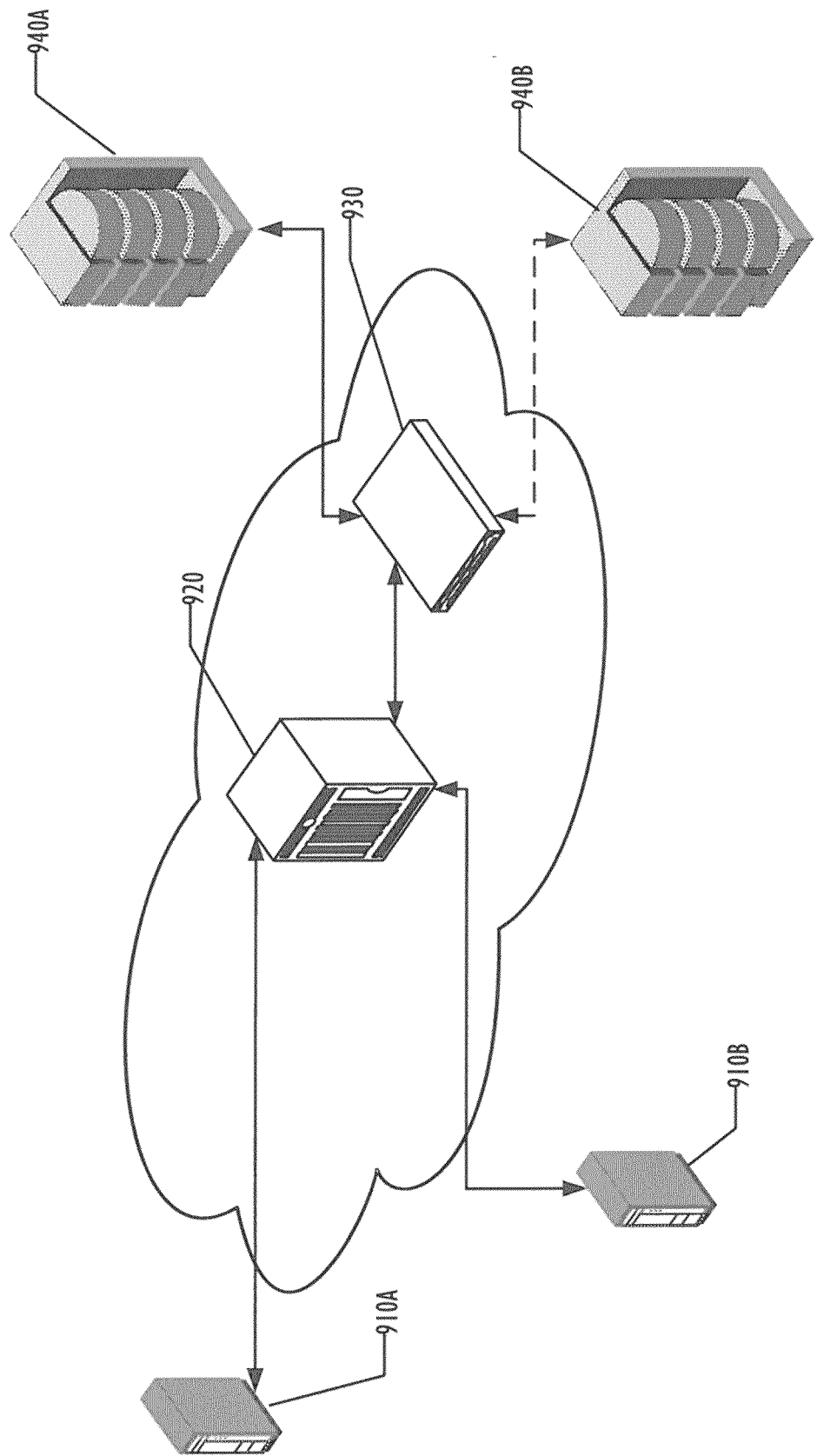
FIG. 9 is a block diagram illustrating replacing a target device according to one embodiment.

Although the description above has been given in terms of moving or replacing hosts in a switch fabric, embodiments may also assist in rapid storage device deployment, by mapping target PWWNs to VPWWNS at the fabric. FIG. 9 is a block diagram in which hosts 910A and 910B are connected to an FC fabric via switch 920. Target 940A is a RAID array, and in this example an administrator of the FC fabric needs to swap target 940B for target 940A. Target 940A is connected to the fabric via switch 930. RAID array 940A has a physical PWWN of PWWN1 and RAID 940B has a physical PWWN of PWWN2. In this example, a user specified VPWWN has been associated with the port on switch 930 to which RAID array 940A is connected. In an HBA-assisted embodiment, RAID array 940A receives the VPWWN and communicates with switch 930 using the VPWWN instead of PWWN1. In an FOS embodiment, RAID array 940A communicates with frames bearing PWWN1, but the FOS maps PWWN1 to the VPWWN. The administrator has created zones using the VPWWN associated with the RAID array 940A, instead of PWWN1.

If target 940A is removed and replaced with target 940B, the replacement can be performed without updating any zone configuration. The FOS mapping of PWWN1 to the VPWWN can be deleted and a new mapping of PWWN2 to the VPWWN can be created, allowing target 940B to connect and communicate with hosts 910A and 910B in the existing zones. As before, in an HBA-assisted embodiment, no configuration changes would be required, if target 940B connects to the same port as target 940A to which target 940A was connected; target 940B may receive and use the VPWWN associated with that port instead of its native PWWN2. In an FOS embodiment, an administrator may update the VPWWN-PWWN mapping database to specify that PWWN2 maps to VPWWN. Target 940B continues to create frames using PWWN2, but switch 930 uses the PWWN2-VPWWN mapping to translate frames to use the VPWWN instead of PWWN2. Alternately, if target 940B connects to the same port as target 940A, the association between the port and the VPWWN may be used to remap target 940B's PWWN to the VPWWN, without a manual remapping by an administrator.

Figure 10:
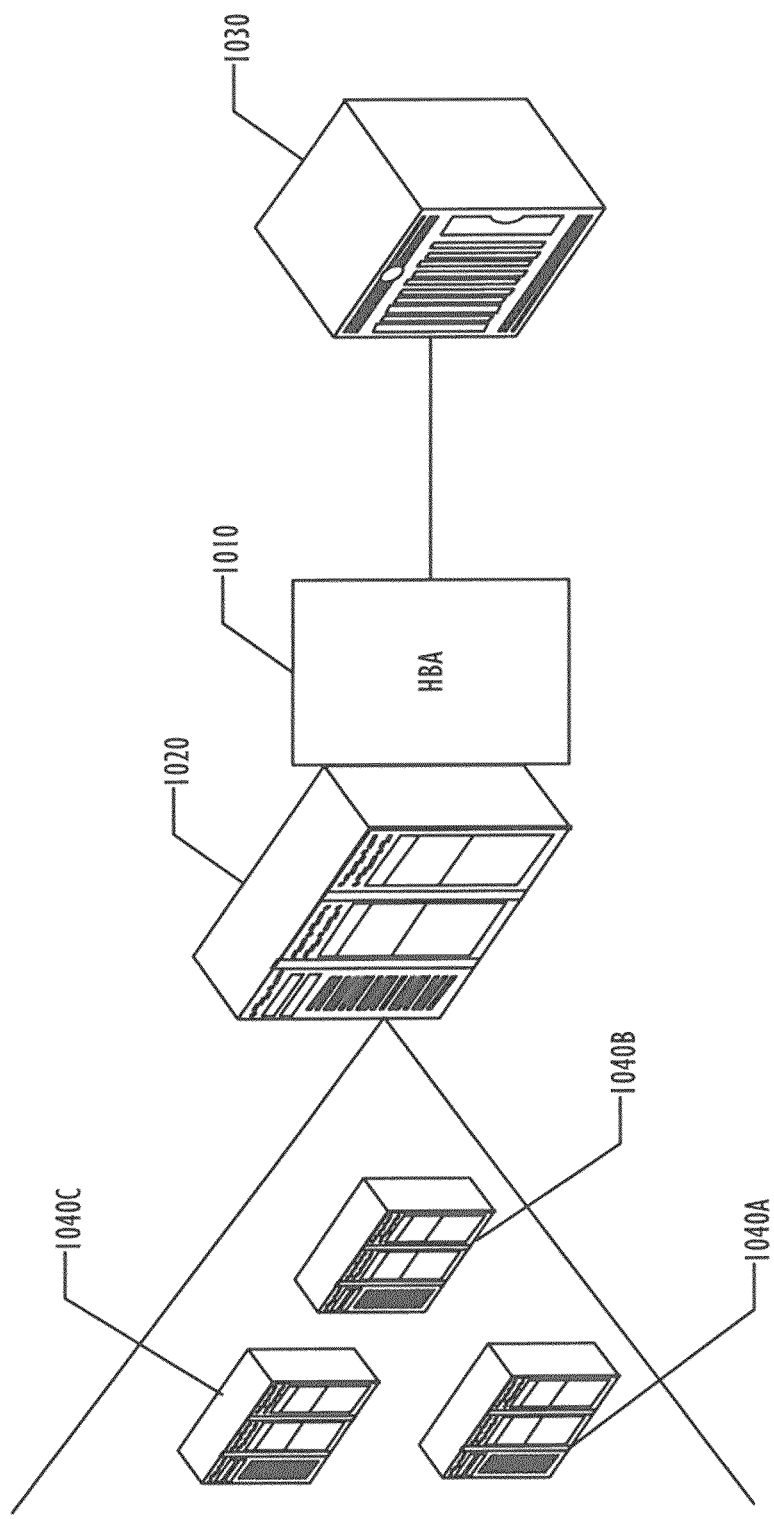
FIG. 10 is a block diagram illustrating an HBA supporting multiple virtual machines according to one embodiment.

The description of NPIV gateway devices above is also relevant to NPIV HBAs, which use a similar technique for employing VPWWNs according to various embodiments. FIG. 10 is a block diagram illustrating an NPIV connected HBA 1010, connecting between mainframe 1020 and FC switch 1030. In this example, virtual machines (VMs) 1040A, 1040B, and 1040C may connect to the FC fabric through a single NPIV connection between the HBA 1010 and the FC switch 1030. The HBA has a predefined PWWN used by communications of all of the VMs 1040A, 1040B, and 1040C; other elements of the NPIV standard allow for differentiating the various VMs that connect over the NPIV connection to the switch 1030. The number of VMs is illustrative and by way of example only, and different HBAs may be configured to support different numbers of VMs.

In an HBA-assisted embodiment, the switch 1030 may associate a VPWWN with the F_port of the switch 1030, then push the VPWWN to the HBA 1010 at fabric login of the HBA 1010. Each VM 1040 attempting to login to the switch fabric uses the VPWWN, as described above, instead of the predefined PWWN.

In an FOS embodiment, the switch 1030 may associate a VPWWN with the F_port of the switch 1030, but instead of pushing the VPWWN to the HBA 1010, as each VM 1040A, 1040B, and 1040C log into the fabric, the switch 1030 maps the HBA's PWWN with the VPWWN, and translates frames as described above, using standard NPIV elements to distinguish between communications of the various VMs.

As described above, the VPWWN allocated to an F_port of the switch 1030 for use with NPIV HBA 1010 and its VMs 1040 may be either a default VPWWN, automatically defined by the FOS, or a user-specified VPWWN.

By providing for the ability to define VPWWNs, many of the problems associated with provisioning and replacing servers and other network fabric components may be significantly reduced or eliminated. Servers may be pre-provisioned to the network fabric before they have been connected to the fabric.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
associating a first worldwide port name with a fabric port of a first network switch;
receiving a second worldwide port name;
associating the second worldwide port name with the fabric port;
selecting one of the first worldwide port name and the second worldwide port name as a selected worldwide port name; and
mapping by the network switch the selected worldwide port name to a predefined worldwide port name for a node port of a network device;
using the selected worldwide port name instead of the predefined worldwide port name for communicating across a network fabric comprising the first network switch and the network device.

2. The method of claim 1, wherein using the selected worldwide port name instead of the predefined worldwide port name comprises:
replacing the predefined worldwide port name with the selected worldwide port name in frames received from the network device; and
replacing the selected worldwide port name with the predefined worldwide port name in frame destined for the network device.

3. The method of claim 1, further comprising:
communicating by the first network switch the selected worldwide port name to the network device responsive to a fabric login request from the node port of the network device.

4. The method of claim 3, wherein using the selected worldwide port name instead of the predefined worldwide port name comprises:
assigning by the network device the selected worldwide port name to the node port of the network device; and
using the selected worldwide port name by the network device instead of the predefined name for the node port of the network device for communicating across the network fabric.

5. The method of claim 3, further comprising:
receiving a signature from the network device as part of the fabric login request; and
validating the signature before communicating the selected worldwide port name to the network device.

6. The method of claim 1, wherein associating a first worldwide port name with a fabric port of a first network switch comprises:
deriving the first worldwide port name automatically from a predefined worldwide port name assigned to a chassis comprising the first network switch.

7. The method of claim 1, further comprising:
verifying that the second worldwide port name is unique across a network fabric; and
rejecting the second worldwide port name if it is not unique across the network fabric.

8. The method of claim 1, wherein associating a first worldwide port name with a fabric port of a first network switch, receiving a second worldwide port name from a user of the first network switch, associating the second worldwide port name with the fabric port, and selecting one of the first worldwide port name and the second worldwide port name as a selected worldwide port name are performed by a second network switch communicatively coupled to the first network switch.

9. The method of claim 1, wherein receiving a second worldwide port name comprises:
deleting a third worldwide port name associated with a second fabric port of the first network switch from the second fabric port; and
receiving the third worldwide port name of the second fabric port as the second worldwide port name.

10. The method of claim 1, wherein receiving a second worldwide port name comprises:
deleting a third worldwide port name associated with a fabric port of a second network switch from the fabric port of the second network switch; and
receiving the third worldwide port name as the second worldwide port name.

11. A network switch comprising:
a processor;
a fabric port; and
software for execution by the processor, comprising:
logic to generate a first worldwide port name;
logic to associate with the first worldwide port name the fabric port;
logic to receive a second worldwide port name;
logic to associate the second worldwide port name with the fabric port;
logic to select one of the first worldwide port name and the second worldwide port name as a selected worldwide port name; and
logic to communicate between a network device connected to the fabric port and other devices in a network switch fabric using the selected worldwide port name, comprising:
logic to replace a predefined worldwide port name of a node port of a network device with the selected worldwide port name in frames received from the network device; and
logic to replace the selected worldwide port name with the predefined worldwide port name in frames destined for the network device.

12. The network switch of claim 11, wherein the logic to communicate between a network device connected to the fabric port and other devices in a network switch fabric using the selected worldwide port name comprises:
logic to communicate via the fabric port the selected worldwide port name to the network device responsive to a fabric login request received by the fabric port from a node port of the network device.

13. The network switch of claim 12, further comprising:
a node port,
wherein the software further comprises:
logic to communicate with a fabric port of another network switch using a node port identifier virtualization protocol.

14. The network switch of claim 12, wherein the software further comprises:
logic to validate a signature received from the network device before communicating the selected worldwide port name to the network device.

15. The network switch of claim 11, wherein the logic to associate a first worldwide port name with a fabric port of a first network switch automatically comprises:
logic to derive the first worldwide port name automatically from a predefined worldwide port name assigned to the network switch.

16. The network switch of claim 11, further comprising:
a second fabric port,
wherein the software further comprises:
   logic to move the association of the selected worldwide port name from the fabric port to the second fabric port.

17. The network switch of claim 11, wherein the logic to receive a second worldwide port name receives the second worldwide port name from a user of the network switch.

18. A system comprising:
a network switch;
a processor;
a fabric port; and
software for execution by the processor, comprising:
   logic to generate a first worldwide port name;
   logic to associate the first worldwide port name with the fabric port;
   logic to receive a second worldwide port name;
   logic to associate the second worldwide port name with the fabric port;
   logic to select one of the first worldwide port name and the second worldwide port name as a selected worldwide port name; and
   logic to communicate via the fabric port using the selected worldwide port name, comprising:
      logic to map the selected worldwide port name to a predefined name for a node port of a network device;
      logic to use the selected worldwide port name instead of the predefined name for communicating across a network fabric comprising the network switch and the network device; and
a host bus adapter, configured to connect a plurality of virtual machines to the fabric port of the network switch via a single connection between the host bus adapter and the network switch,
wherein the selected worldwide port name is associated with a virtual machine of the plurality of virtual machines.

* * * * *